United States Patent
Kreutzer et al.

(10) Patent No.: US 10,626,966 B2
(45) Date of Patent: Apr. 21, 2020

(54) BALL SCREW DRIVE AND ASSOCIATED ELECTROMECHANICAL ACTUATOR

(71) Applicant: SCHAEFFLER TECHNOLOGIES AG & CO. KG, Herzogenaurach (DE)

(72) Inventors: Mario Kreutzer, Sonneberg (DE); Christian Marty, Weisendorf (DE); Harry Schmeiko, Weisendorf (DE); Manfred Gotz, Memmelsdorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 124 days.

(21) Appl. No.: 15/546,286

(22) PCT Filed: Jan. 14, 2016

(86) PCT No.: PCT/DE2016/200017
§ 371 (c)(1),
(2) Date: Jul. 26, 2017

(87) PCT Pub. No.: WO2016/119784
PCT Pub. Date: Aug. 4, 2016

(65) Prior Publication Data
US 2018/0017147 A1    Jan. 18, 2018

(30) Foreign Application Priority Data
Jan. 26, 2015 (DE) .................. 10 2015 201 257

(51) Int. Cl.
*F16H 25/22* (2006.01)
*B60T 13/74* (2006.01)
(Continued)

(52) U.S. Cl.
CPC ........ *F16H 25/2223* (2013.01); *B60T 13/741* (2013.01); *B60T 13/745* (2013.01);
(Continued)

(58) Field of Classification Search
CPC .. F16H 25/2223; F16D 65/14; F16D 2125/36; F16D 2125/40; B60T 13/745; B60T 13/741
(Continued)

(56) References Cited

U.S. PATENT DOCUMENTS 2,076,180 A * 4/1937 Griswold ............... F16C 19/50
384/451
4,080,011 A * 3/1978 Wilke ................. F16H 25/2204
384/45
(Continued)

FOREIGN PATENT DOCUMENTS

CN 101517270 A 8/2009
DE 102009012235 A1 9/2009
(Continued)

OTHER PUBLICATIONS

International Search Report for Application No. PCT/DE2016/200017, dated May 4, 2016, 5 Pages.
(Continued)

*Primary Examiner* — Thomas J Williams
*Assistant Examiner* — Mariano Sy
(74) *Attorney, Agent, or Firm* — Brooks Kushman P.C.

(57) ABSTRACT

A ball screw of an electromechanical brake comprising a ball screw nut disposed on a spindle, wherein the spindle includes complementary tracks formed on the spindle and the ball screw nut. The ball screw further includes a race that includes a plurality of ball pockets spaced apart from one another and a protruding section that includes a concave bearing surface, a ball housed between the concave bearing surface and an end section of a first spring element for a main load direction, and a second spring element for a return (Continued)

stroke direction, wherein the second spring element includes a second spring end section in contact with an opposite side of the bearing surface.

16 Claims, 4 Drawing Sheets

(51) Int. Cl.
    *F16D 65/14*     (2006.01)
    *F16D 125/36*     (2012.01)
    *F16D 125/40*     (2012.01)

(52) U.S. Cl.
    CPC .......... *F16D 65/14* (2013.01); *F16H 25/2233* (2013.01); *F16D 2125/36* (2013.01); *F16D 2125/40* (2013.01)

(58) Field of Classification Search
    USPC ........... 188/72.8; 74/424.81, 424.82, 424.75; 384/51, 45, 49
    See application file for complete search history.

(56) References Cited

U.S. PATENT DOCUMENTS

| | | | | |
|---|---|---|---|---|
| 4,542,661 A | * | 9/1985 | Teramachi | B23Q 5/402 74/424.75 |
| 4,920,817 A | * | 5/1990 | Granbonn | F16H 25/2204 74/424.9 |
| 6,668,673 B2 | * | 12/2003 | Hsu | F16C 19/14 384/49 |
| 7,771,307 B2 | | 8/2010 | Fujii | |
| 8,616,348 B2 | * | 12/2013 | Winkler | F16D 65/18 188/196 V |
| 8,671,789 B2 | * | 3/2014 | Osterlaenger | F16H 25/2233 188/72.8 |
| 9,863,514 B2 | * | 1/2018 | Tashiro | F16D 65/18 |
| 2011/0011191 A1 | * | 1/2011 | Osterlaenger | F16C 19/30 74/89.23 |
| 2011/0120247 A1 | | 5/2011 | Osterlaenger et al. | |
| 2012/0018262 A1 | * | 1/2012 | Winkler | F16D 65/18 188/106 F |
| 2015/0330487 A1 | | 11/2015 | Wilhelm et al. | |

FOREIGN PATENT DOCUMENTS

| | | |
|---|---|---|
| DE | 102013202099 A1 | 6/2014 |
| JP | S54120366 A | 9/1979 |
| JP | 2003028263 A | 1/2003 |
| WO | 2005078308 A1 | 8/2005 |
| WO | 2009053359 A1 | 4/2009 |

OTHER PUBLICATIONS

Office Action for German Application No. 102015201257.3, dated Oct. 13, 2015, 8 Pages.

Chinese Office Action for Application No. 201680006634.5, dated Dec. 20, 2018, 6 pages.

\* cited by examiner

BALL SCREW DRIVE AND ASSOCIATED ELECTROMECHANICAL ACTUATOR

CROSS-REFERENCE TO RELATED APPLICATIONS

This application is the U.S. National Phase of PCT/DE2016/200017 filed Jan. 14, 2016, which claims priority to DE 102015201257.3 filed Jan. 26, 2015, the entire disclosures of which are incorporated by reference herein.

TECHNICAL FIELD

A ball screw may include a ball screw nut disposed on a spindle, and complementary tracks formed on the spindle and the ball screw nut, in which balls are accommodated in a race and at least one spring element for generating a reset force.

BACKGROUND

In contrast to a threadless ball screw, the balls in a ball screw nut may not circulate or deflect. The balls may move in both directions until they reach a stop.

Such ball screws may be used as components of an electromechanical actuator. An electric drive motor is coupled thereby with either the spindle or the ball screw nut, such that the rotational movement generated by the drive motor is converted to a linear movement. An electromechanical actuator of this type can be used as a brake or as a parking brake in a motor vehicle, in that a displacement of the ball screw nut displaces a piston of a hydraulic brake system, in a manner of which brake pads are pressed against the brake disk.

A ball screw is known from WO 2009/053359 A1, in which springs are located in the tracks, in addition to balls. As a result, the availability of a roller path in which the balls can roll is always ensured. The balls roll when subjected to a load, but they can be displaced when they are actuated without a load. Because numerous spring elements, referred to therein as intermediate spring elements, are used, the friction may be reduced between adjacent balls.

A ball screw drive, as shown in DE 10 2013 202 099 A1 discloses a rod disposed between its race and its spring element.

Another ball screw drive is proposed in DE 10 2009 012 235 A1, which also includes a roller bearing race. The race prevents the rollers from touching one another, and as a result, a reduction in the efficiency caused by friction is prevented. Because a spring element bears on the race, an end of the spring element can be displaced under load between the race and the tracks or the grooves of the spindle or the ball screw nut, resulting in an unintended change in the spring force.

The embodiments therefore may address the object of creating a ball screw that is designed such that the end section of a spring element cannot become jammed.

In order to achieve this objective, a ball drive is disclosed that includes a ball that is disposed between the race and the at least one spring element.

SUMMARY

In differing from the prior art, the spring element does not bear directly on the race, in particular on an edge of the race in the circumference thereof. Instead, a ball may be disposed between the race and the spring element, which prevents the end section of the spring element from being displaced into the intermediate space formed between the race and a track. The intermediate space can be formed thereby between the race and the track formed on the spindle, as well as between the race and the track formed on the ball screw nut. The end section of the spring element is spring-loaded against the ball, such that the spring is centered. As a result, the end section of the spring is prevented from being displaced under load into an intermediate space not intended for this, wherein this displacement also reduces the reset force generated by the spring. Accordingly, the ball may ensure that a consistent reset force is always generated by the spring element, and the ball causes a precise positioning of the end section, in addition to a centering of the end section of the spring element.

According to a first design of the ball screw, it may be provided that the diameter of the ball disposed between the race and the at least one spring element is large enough that it is a supporting ball. The diameter of the ball may be selected such that it rolls under load between the opposing tracks. This ball may be identical to the other balls disposed between the spindle and the ball screw nut.

According to an alternative design of the ball screw, it may be provided that the diameter of the ball disposed between the race and the at least one spring element is small enough that it is not a supporting ball. The ball may support no axial load, and the ball thus does not roll between the tracks. The ball thus may include a smaller diameter than the other balls disposed between the spindle and the ball screw nut.

According to another embodiment, the race may include at least one concave bearing surface adapted to the outer contour of the ball disposed between the race and the at least one spring element. This concave bearing surface is substantially complementary to the shape of the ball, such that the ball and the outer contour of the race are in contact along a line. The bearing surface of the race can be formed on an axially extended section of the race. The race may also comprise numerous bearing surfaces of this type for numerous balls.

The ball screw may include at least two spring elements, which are disposed such that they generate opposing reset forces. Accordingly, a first spring element may be disposed such that it exerts a force on the race in a first rotational direction. A further spring element can then be disposed such that it exerts a force on the race in the opposing rotational direction. The two spring elements may bear on the race thereby via a ball. The two bearing surfaces of the race can be disposed on opposite sides of an axial projection on the race in the circumference. In numerous applications, the ball screw has a stroke direction, in which it is moved under load. In the opposite direction, the so-called return stroke direction, the movement takes place, in contrast, with practically no load. For applications of this type, the ball of that spring element dedicated to the return stroke direction may be eliminated. In some cases, the spring element dedicated to the return stroke direction may also be eliminated.

The ball screw may include two spring elements that are axially offset to one another, which are disposed such that they generate reset forces acting in the same direction. With this configuration, the spring elements may be disposed in parallel, by means of which a higher overall reset force can be generated. Consequently, there is the advantage that the surface pressure on the individual spring elements may be reduced. In this manner, the danger of a spring element becoming deformed in an undesired manner may be reduced. Two parallel spring elements may be disposed such that they are disposed in the region of the axial ends of the ball screw. Accordingly, the race can comprise appropriate bearing surfaces on the two axial ends, adapted to the outer contour of the balls.

The length of a spring element can be between one half of the circumference and approximately three quarters of the circumference of the track in the ball screw. A spring element may extend over one half of the circumference of the track or over approximately three quarters of the circumference of a (e.g. circular) track. The spring force generated by the spring element may be influenced by the determination of the length of a spring element.

The tracks in the spindle may be designed such that the balls accommodated in the race are retained therein, or the tracks in the ball screw nut are designed such that the balls accommodated in the race are retained therein. When the ball retention takes place in the ball screw nut, there is the advantage that the spindle can be installed or removed, without the supporting balls falling out. In the other case, when the ball retention takes place on the spindle, the spindle can be installed or removed, wherein the balls are retained on the spindle.

The ball screw may include either radially inward displaced or radially outward displaced ball pockets. When the race, or more precisely its ball pockets, are not located on the equator, the balls may be displaced radially inward or radially outward. The radially inward or radially outward displaced ball pockets can also be designed as a profile formed on the race, which is displace radially inward or radially outward in relation to the cylindrical race surface.

In addition, an electronic actuator may include a ball screw of the type described herein, and an electric drive motor, coupled to either the spindle or the ball screw nut. The electromechanical actuator may be a component of an electromechanical brake and/or an electromechanical parking brake.

The description explained below is based on exemplary embodiments in reference to the drawings. The drawings are schematic illustrations.

DETAILED DESCRIPTION

Figure 1:
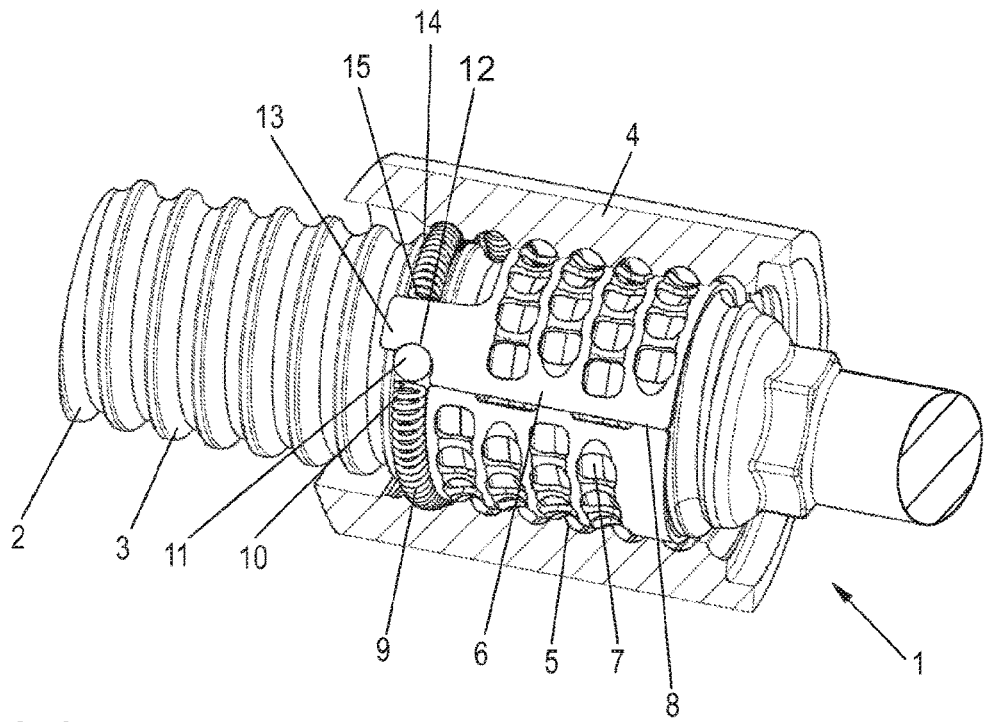
FIG. 1 shows a first exemplary embodiment of a ball screw in a perspective, partially cutaway view.

The ball screw 1 shown in FIG. 1 comprises a spindle 2, a portion of which is shown in FIG. 1. The spindle 2 has tracks 3. In addition, the ball screw 1 comprises a ball screw nut 4, also referred to as a linear actuator nut. The cylindrical ball screw nut 4 has internal tracks 5, which are adapted to the tracks 3 of the spindle 2, such that balls can be accommodated in the interior of the ball screw nut 4. The ball screw 1 comprises a race 6, through which the rollers formed as balls are guided. It can be seen in FIG. 1 that the race 6 comprises numerous axially adjacent rows of ball pockets 7, spaced apart from one another, and in which a ball can be received in each case.

In this case, the race 6 may be produced from steel sheet metal, and designed as a stamped bending part. In the view in FIG. 1, a joint 8 running in the axial direction can be seen, wherein the free ends of the race 6 adjoining one another are welded together. In order to avoid plastic deformation, the race 6 can optionally be subjected to a heat treatment, depending on the forces acting on the ball screw 1.

The ball screw 1 has a first spring element 9, which may be designed as a helical compression spring, and may be received between the complementary tracks 3, 5 of the spindle 2 and the ball screw nut 4. In the depicted exemplary embodiment, the first spring element 9 extends over approximately one half of the circumference of the tracks, i.e. over ca. 180°. It can be seen in FIG. 1 that an end section 10 of the first spring element 9 does not bear directly on the race 6, but rather on a ball 11. On its opposite side, the ball 11 bears on a concave bearing surface 12 of the race 6. The race 6 has a section 13 there, extending in the axial direction, on which the bearing surface 12 for the ball 11 is formed. In this exemplary embodiment, the ball 11 may be a supporting ball such that its outer diameter may roll on the tracks 3, 5 when the ball screw 1 is moved.

The first spring element 9 shown in FIG. 1 is dedicated to the main load direction. The spring element 9 retains a raceway for the balls, such that they may roll instead of slide when the spindle 2 moves in relation to the ball screw nut 4.

Because the end section 10 of the first spring element 9 bears on the ball 11, the end section 11 is centered, by means of which it is prevented from ending up in an intermediate space between the race 6 and one of the two tracks 3, 5. This may be possible with conventional ball screws, in which the end section of the spring element bears directly on the race.

Figure 2:
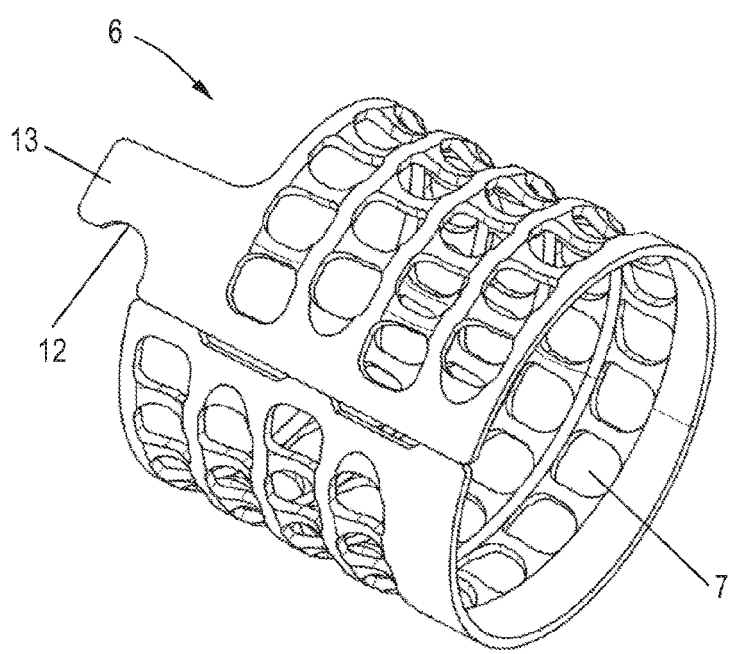
FIG. 2 shows a perspective view of the race of the ball screw shown in FIG. 1.
Figure 3:
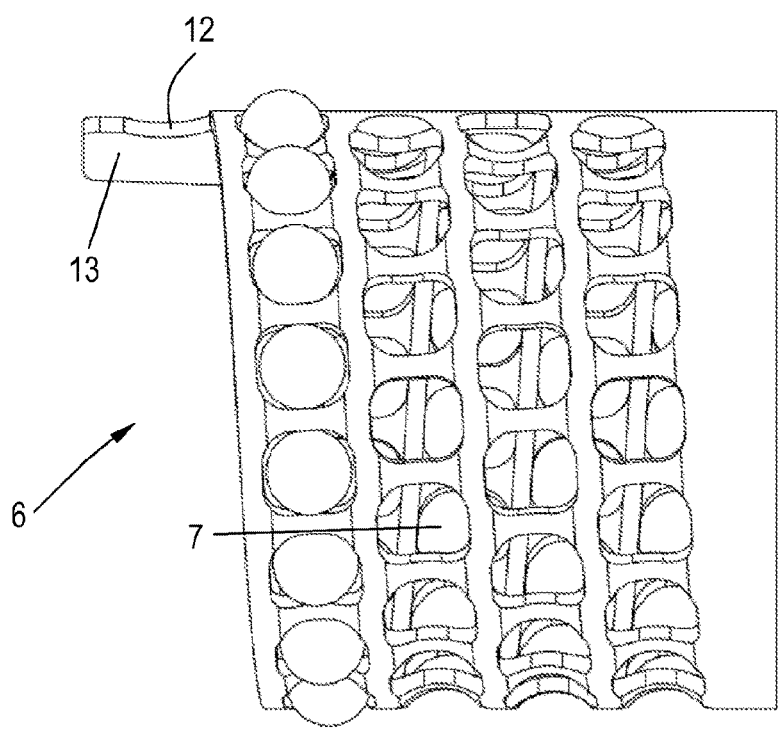
FIG. 3 shows a side view of the race shown in FIG. 2.

FIGS. 2 and 3 show the race 6, wherein FIG. 2 is a perspective view and FIG. 3 is a side view. The race 6 is shown without balls therein, which are placed in the ball pockets 7 in the assembled state.

A second spring element 14 is shown in FIG. 1, which likewise bears on the protruding section 13 of the race 6. However, the second spring element 14 bears on the opposite side of the bearing surface 12 on the section 13, such that the second spring element 14 exerts a force directed opposite the force generated by the first spring element 9. The second spring element 14 is dedicated to the return stroke direction, whereas the first element 9 is dedicated to the main load direction. The second spring element 14, dedicated to the return stroke direction, is subjected to substantially lower loads than the first spring element, such that a ball between the end section 15 of the second spring element 14 and the bearing surface can be eliminated. Likewise, a specially shaped bearing surface like that provided on the opposite side for the ball 11 is not needed for the end section 15 of the second spring element 14. In certain applications, even the second spring element 14 can be eliminated.

Figure 4:
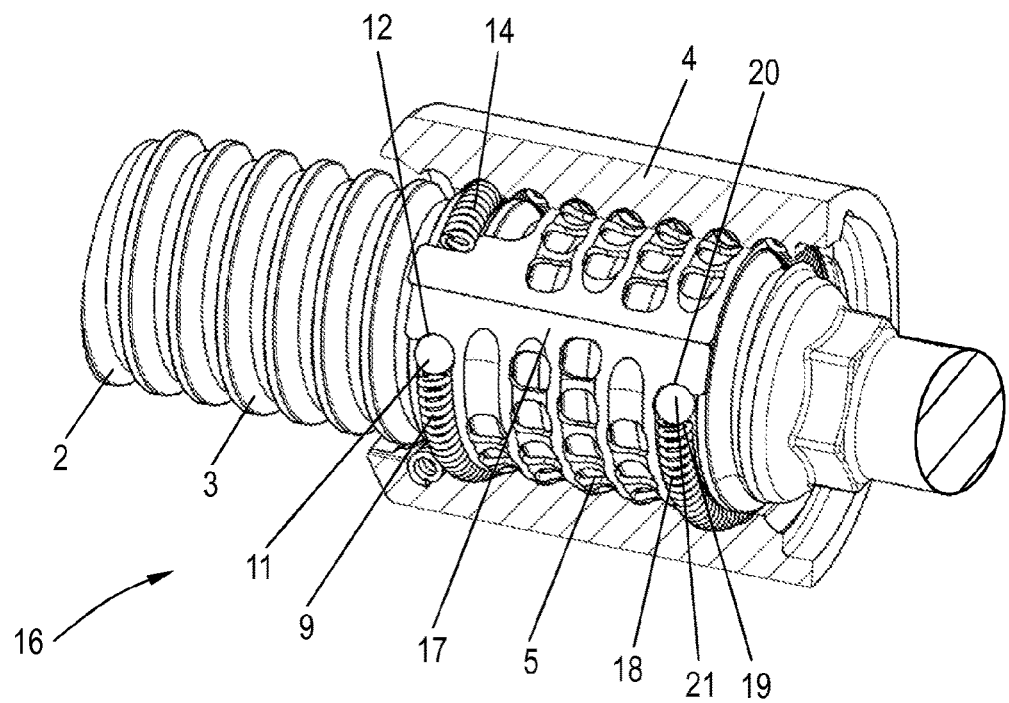
FIG. 4 shows another exemplary embodiment of a ball screw in a perspective, partially cutaway view.

FIG. 4 shows another exemplary embodiment of a ball screw 16, which is substantially identical to the ball screw 1 shown in FIG. 1. For this reason, identical components shall not be explained in detail again at this point. The ball screw 16, in conforming to the first exemplary embodiment, comprises a spindle 2 with tracks 3, and a ball screw nut 4 with tracks 5. Balls (not shown) are received in the complementary tracks 3, 5, guided by a race 17. The first spring element 9, the ball 11 and the second spring element 14 are accommodated between the tracks. There is an end section of the spring element 14 below the first spring element 9, which bears on the ball screw nut 4.

In differing from the ball screw 1 shown in FIG. 1, the ball screw 16 shown in FIG. 4 has a third spring element 18, disposed on the axial side of the ball screw nut 4 opposite the first spring element 9. A ball 21 is disposed between an end section 19 of the third spring element 18 and a bearing surface 20 of the race 17, which is identical to the ball 11. The opposite end of the third spring element 18, which is hidden in FIG. 4, bears on the ball screw nut 4. In modified embodiments, this end can also bear on another (not shown) element, e.g. a pin or a disk press-fitted therein.

It can be seen in FIG. 4 that the two spring elements 9, 18 are disposed parallel to one another, and generate parallel forces. As a result of the bearing surface 20, formed like the bearing surface 12, the end section 19 of the third spring element 18 is prevented from being displaced into a free space between the race 17 and one of the tracks 3, 5. As a result of the parallel spring elements 9, 18, the overall force generated by the spring elements 9, 18 is increased and set to a specific value. In other exemplary embodiments, a third parallel spring may also be provided.

Figure 5:
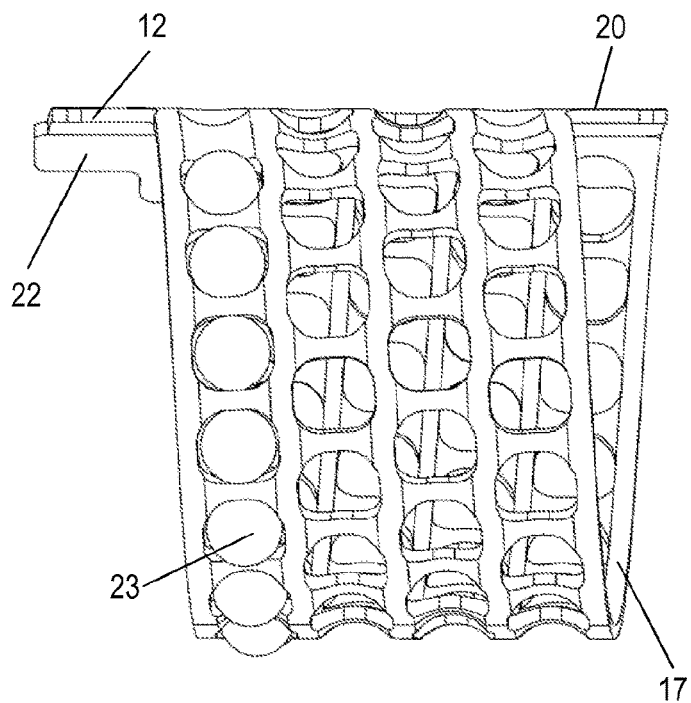
FIG. 5 shows the race of the ball screw shown in FIG. 4, in a side view.
Figure 6:
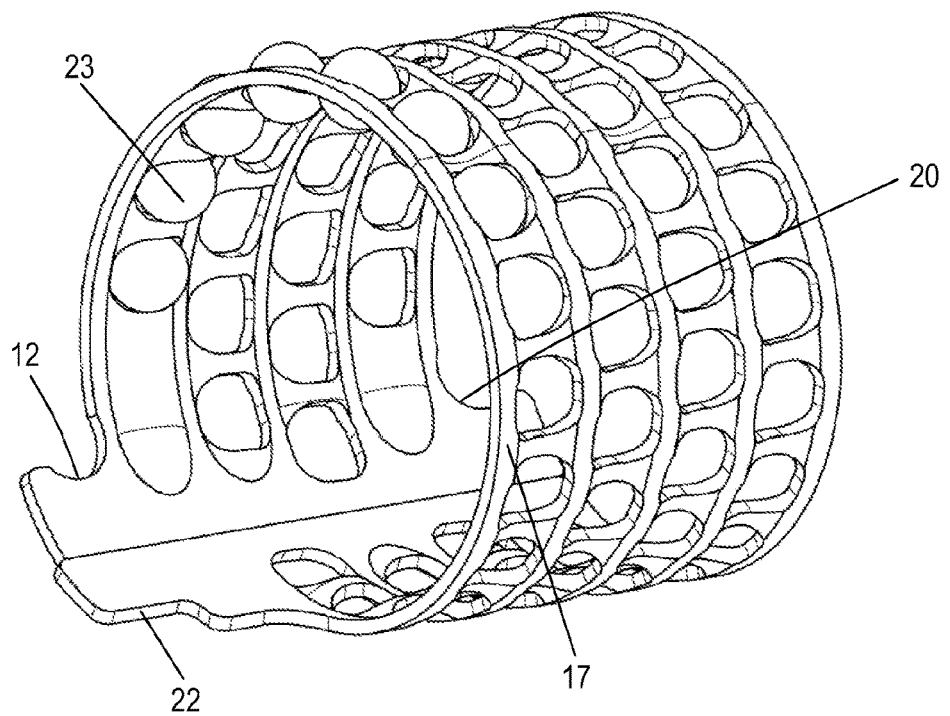
FIG. 6 shows a race of a ball screw.
Figure 7:
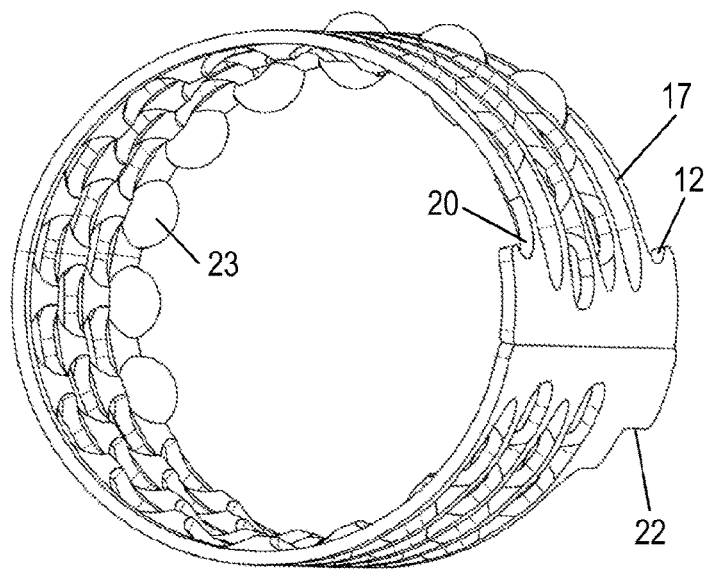
FIG. 7 shows another perspective view of the race shown in FIG. 6.

FIGS. 5, 6, and 7 show a side view and parallel views of the race 17. The concave bearing surfaces 12, 20 for the balls 11, 21 can be seen in FIG. 5. It can be seen in FIG. 5 that a bearing surface 22 for the second spring element 14 is designed as a straight, axial edge, such that a concave bearing surface is not provided for the second spring element 14. A few supporting balls 23 are shown in FIGS. 5, 6, and 7 in each case, which are guided by the race 17. The race 17 has ball pockets 7, which are radially offset toward the inside with respect to the race 17. In this manner, balls 23 are retained in the ball screw nut 4 by the race 17, such that the spindle 2 can be screwed out, without the supporting balls 23 falling out.

Figure 8:
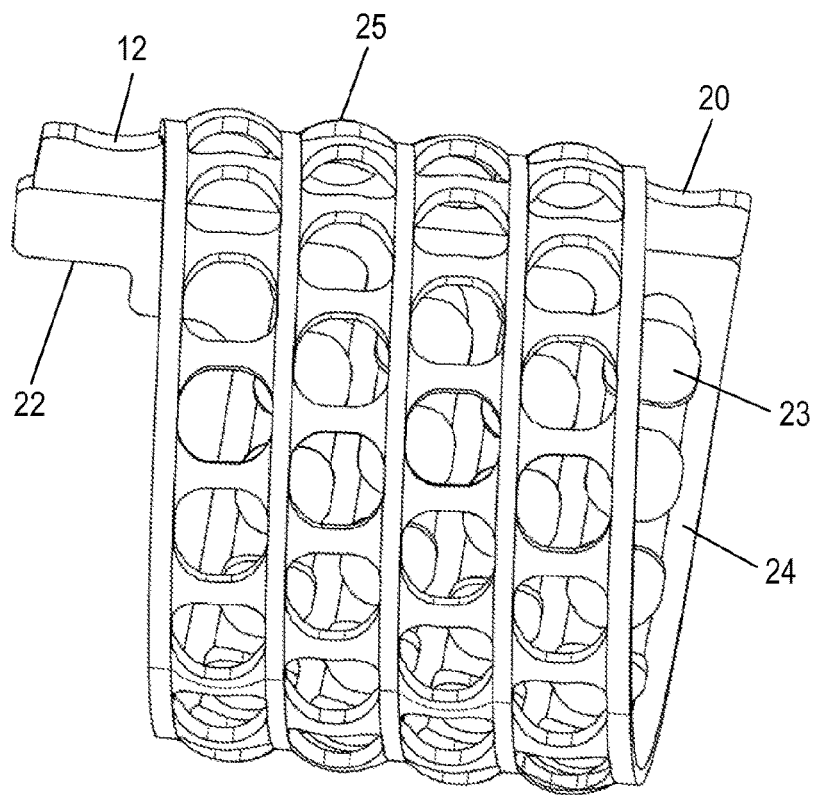
FIG. 8 shows a modified embodiment of a race of a ball screw.

Differing therefrom, FIG. 8 shows a race 24 of another design, which, in conforming to the race 17, comprises circle segment-shaped bearing surfaces 12, 20 for balls 11, 21, which each center a spring element. Furthermore, the race 24 includes the axial bearing surface 22.

In differing from the race 17, the race 24 has ball pockets 25, which are radially offset toward the outside with respect to the circumferential surface of the race 24. As a result of this special design of the ball pockets 25, the supporting balls 23 are retained on the spindle 2 by the race 24, such that the ball screw nut 4 can be removed without the balls 23 falling off. The balls 23 are retained, offset toward the inside with respect to their equator, by the ball pockets 25 that are offset toward the outside.

The ball screws 1, 16 are components of an electromechanical brake, wherein the spindle 2 is coupled to an electric drive motor. The rotation of the drive motor is converted to a displacement of the ball screw nut 4, by means of which a piston pushes against a brake pad, resulting in the brake pad being pressed against a brake disk.

LIST OF REFERENCE SYMBOLS 1 ball screw
2 spindle
3 track
4 ball screw nut
5 track
6 race
7 ball pocket
8 joint
9 spring element
10 end section
11 ball
12 bearing surface
13 section
14 spring element
15 end section
16 ball screw
17 race
18 spring element
19 end section
20 bearing surface
21 ball
22 bearing surface
23 ball
24 race
25 ball pocket

The invention claimed is:

1. A ball screw comprising:
a ball screw nut disposed on a spindle, wherein the ball screw includes a first and second spring element disposed axially offset to one another and disposed such that the first and second spring element generate reset forces acting in the same direction; and
complementary tracks formed on the spindle and the ball screw nut, in which a ball is accommodated in a race and the first spring element for generating a reset force are disposed, wherein the ball is disposed between the race and the first spring element.

2. The ball screw of claim 1, wherein a diameter of the ball disposed between the race is large enough that the ball is a supporting ball.

3. The ball screw of claim 1, wherein a diameter of the ball disposed between the race and the first spring element is small enough that the ball is not a supporting ball.

4. The ball screw of claim 1, wherein the race includes at least one concave bearing surface adapted to an outer contour of the ball.

5. The ball screw of claim 1, wherein the ball screw includes the first and second spring elements disposed such that the first and second spring elements generate opposing reset forces.

6. The ball screw of claim 1, wherein a length of the first spring element is between one half of a circumference and approximates three quarters of the circumference of the track.

7. The ball screw of claim 1, wherein the complimentary tracks on the spindle and the ball screw nut are configured to accommodate balls in the race to be retained therein.

8. The ball screw of claim 1, wherein the race includes ball pockets that are radially offset.

9. A ball screw of an electromechanical brake, comprising:
a ball screw nut disposed on a spindle, wherein the spindle includes complementary tracks formed on the spindle and the ball screw nut;
a race that includes a plurality of ball pockets spaced apart from one another and a protruding section that includes a concave bearing surface;
a ball housed between the concave bearing surface and an end section of a first spring element for a main load direction; and
a second spring element for a return stroke direction, wherein the second spring element includes a second spring end section in contact with an opposite side of the bearing surface.

10. The ball screw of the electromechanical brake of claim 9, wherein a diameter of the ball includes an outer diameter configured to roll on the tracks when the ball screw is moved.

11. The ball screw of the electromechanical brake of claim 9, wherein the first or second spring element retains a raceway configured to allow the ball to roll when the spindle moves in relation to the ball screw nut.

12. The ball screw of the electromechanical brake of claim claim 9, wherein the ball pockets are radially offset toward the outside of a circumferential surface of the race.

13. The ball screw of the electromechanical brake of claim claim 9, wherein the ball pockets are configured to retain the ball on the spindle such that the ball screw nut can be removed without the ball falling.

14. The ball screw of the electromechanical brake of claim claim 9, wherein the plurality of ball pockets are radially offset toward an inside with respect to the race.

15. The ball screw of the electromechanical brake of claim claim 9, wherein the race includes a bearing surface of a section extending in an axial direction of the race, wherein a second spring element is disposed on an opposite side of the bearing surface and the second spring element exerts a force directed opposite the force generated by a first spring element.

16. The ball screw of the electromechanical brake of claim claim 9, wherein the spring element is a helical compression spring.

\* \* \* \* \*